(12) United States Patent
Jee

(10) Patent No.: US 8,082,003 B2
(45) Date of Patent: Dec. 20, 2011

(54) MOBILE TERMINAL AND OPERATION CONTROL METHOD THEREOF

(75) Inventor: Hyun Ho Jee, Seoul (KR)

(73) Assignee: LG Electronics Inc., Seoul (KR)

( * ) Notice: Subject to any disclaimer, the term of this patent is extended or adjusted under 35 U.S.C. 154(b) by 480 days.

(21) Appl. No.: 12/337,240

(22) Filed: Dec. 17, 2008

(65) Prior Publication Data

US 2010/0029327 A1    Feb. 4, 2010

(30) Foreign Application Priority Data

Jul. 29, 2008    (KR) ................ 10-2008-0074180

(51) Int. Cl.
    *H04M 1/00*    (2006.01)
(52) U.S. Cl. .................... 455/556.1; 455/566
(58) Field of Classification Search ........... 455/556.1, 455/566, 575.6
    See application file for complete search history.

(56) References Cited

U.S. PATENT DOCUMENTS

| | | | |
|---|---|---|---|
| 2005/0132420 A1* | 6/2005 | Howard et al. .......... | 725/135 |
| 2008/0192020 A1* | 8/2008 | Kang et al. ............. | 345/173 |
| 2009/0061960 A1* | 3/2009 | Chang et al. ........... | 455/575.3 |
| 2009/0096753 A1* | 4/2009 | Lim ...................... | 345/173 |
| 2009/0267828 A1* | 10/2009 | Kobayashi et al. ..... | 342/357.06 |

FOREIGN PATENT DOCUMENTS

| | | |
|---|---|---|
| DE | 4422260 A1 | 1/1996 |
| DE | 10107702 A1 | 8/2002 |
| EP | 1 923 778 A2 | 5/2008 |
| WO | WO-00/59327 A1 | 10/2000 |
| WO | WO-2007/069116 A2 | 6/2007 |

* cited by examiner

*Primary Examiner* — Peguy Jean Pierre

(74) *Attorney, Agent, or Firm* — Birch, Stewart, Kolasch & Birch, LLP

(57) ABSTRACT

A mobile terminal including a flexible display provided on a main body of the mobile terminal, in which the flexible display is configured to flex as the mobile terminal is attached to a part of the human body. The mobile terminal also includes a sensor configured to sense at least one of a position and movement of the main body, and a controller configured to control the flexible display to display an image in a first area of the flexible display so that a display direction of the image is in a first direction, and to move the displayed image in the first area to a second area of the flexible display based on the at least of the sensed position and movement of the main body so that the display direction of the image is maintained in the first direction.

22 Claims, 15 Drawing Sheets

(a)  (b)  (c)

(a)              (b)

MOBILE TERMINAL AND OPERATION CONTROL METHOD THEREOF

This application claims the benefit of Korean Application No. 10-2008-0074180, filed Jul. 29, 2008, in the Korean Intellectual Property Office, the disclosure of which is incorporated herein by reference.

BACKGROUND OF THE INVENTION

1. Field of the Invention

The present invention relates to a mobile terminal configured to be attached to the human body.

2. Description of the Related Art

A mobile terminal is a portable device equipped with one or more Functions for performing voice and video communications, inputting and outputting information, storing data, etc. Thus, the user of a mobile terminal can carry their mobile terminal with them and wirelessly connect with other terminals.

However, it is sometimes inconvenient for the user to carry the terminal. The user can also forget to bring their terminal with them, and then need to return home to retrieve their terminal.

SUMMARY OF THE INVENTION

Accordingly, one object of the present invention is to address the above-noted and other drawbacks.

Another object of the present invention is to provide a mobile terminal having a flexible display and that can be worn by a user.

Yet another object of the present invention is to shift or move an image on a display of the terminal so that the image faces the user even when the user moves.

To achieve these and other advantages and in accordance with the purpose of the present invention, as embodied and broadly described herein, the present invention provides in one aspect a mobile terminal including a flexible display provided on a main body of the mobile terminal, in which the flexible display is configured to flex as the mobile terminal is attached to a part of the human body. The mobile terminal also includes a sensor configured to sense at least one of a position and movement of the main body, and a controller configured to control the flexible display to display an image in a first area of the flexible display so that a display direction of the image is in a first direction, and to move the displayed image in the first area to a second area of the flexible display based on the at least of the sensed position and movement of the main body so that the display direction of the image is maintained in the first direction.

In another aspect, the present invention provides a method of controlling a mobile terminal, and which includes sensing at least one of a position and movement of a main body of the mobile terminal, in which the main body includes a flexible display configured to flex as the mobile terminal is attached to a part of the human body. The method also includes displaying an image in a first area of the flexible display so that a display direction of the image is in a first direction, and moving the displayed image in the first area to a second area of the flexible display based on the at least of the sensed position and movement of the main body so that the display direction of the image is maintained in the first direction.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

The present invention will now be described in detail in connection with specific embodiments with reference to the accompanying drawings.

Embodiments of the present invention relate to a mobile terminal having a flexible display and that can be worn by a user. The flexible display can be folded, bent or rolled unlike a general flat panel display. Thus, a mobile terminal can be configured to be a watch phone or bracelet having a curved shape surrounding the user's wrist, for example. Further, according to embodiments of the present invention, the information displayed on the terminal is aligned with a user's sight, even when the user rotates his or her wrist, for example.

Figure 1:
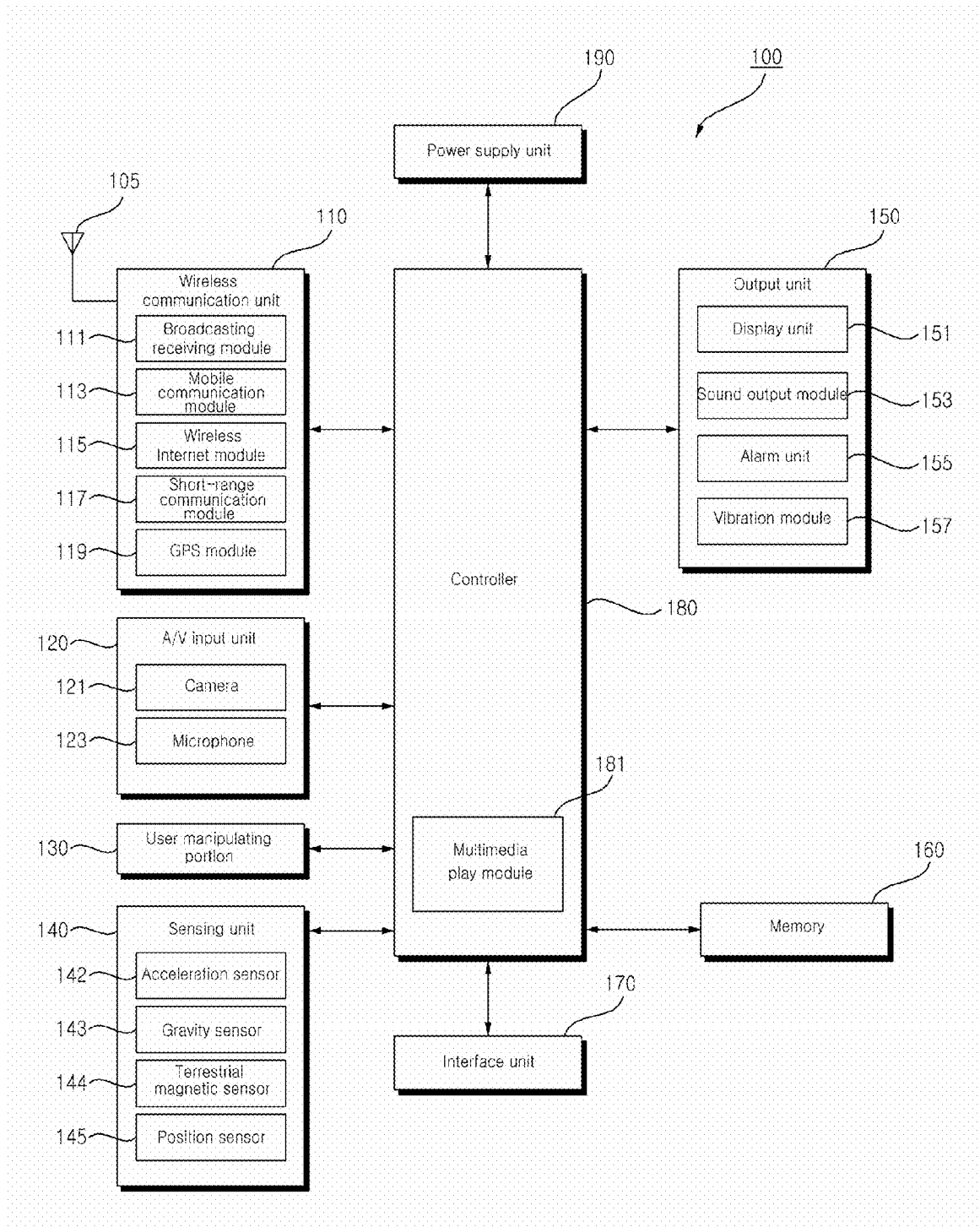
FIG. 1 is a block diagram of a mobile terminal according to an embodiment of the present invention.

FIG. 1 is a block diagram illustrating a mobile terminal 100 according to an embodiment of the present invention. As shown in FIG. 1, the mobile terminal 100 includes a wireless communication unit 110, an audio/video (A/V) input unit 120, a user manipulating portion 130, a sensing unit 140, an output unit 150, a memory 160, an interface unit 170, a controller 180, and a power supply unit 190.

Further, the wireless communication unit 110 includes a broadcasting receiving module 111, a mobile communication module 113, a wireless Internet module 115, a short-range communication module 117, and a global positioning system (GPS) module 119. The broadcasting receiving module 111 receives at least one of broadcasting signals and broadcasting-associated information from an external broadcasting management server through broadcasting channels.

In addition, the broadcasting channels may include a satellite channel, a terrestrial wave channel and the like. A broadcasting management server can be a server for creating and transmitting at least one of the broadcasting signals and broadcasting-associated information or a sever for receiving at least one of previously generated broadcasting signals and previously generated broadcasting-associated information and transmitting the same to a terminal.

Further, the broadcasting-associated information corresponds to information pertinent to a broadcasting channel, a broadcasting program and/or a broadcasting service provider, for example. The broadcasting signal may include not only TV broadcasting signals, radio broadcasting signals, and data broadcasting signals, but also broadcasting signals in which TV broadcasting signals or radio broadcasting signals are combined with data broadcasting signals. The broadcasting-associated information may also be provided over a mobile communication network, and be received by the mobile communication module 113.

Further, the broadcasting-associated information can exist in various forms. For instance, the broadcasting-associated information can exist in the form of an electronic program guide (EPG) of the digital multimedia broadcasting (DMB) system, an electronic service guide (ESG) of the digital video broadcast-handheld (DVB-H) system or the like.

Also, the broadcasting receiving module 111 receives broadcasting signals using various broadcasting systems. In particular, the broadcasting receiving module 111 can receive broadcasting signals using a digital broadcasting system, such as the digital multimedia broadcasting-terrestrial (DMB-T) system, the digital multimedia broadcasting-satellite (DMB-S) system, the media forward link only (MediaFLO) system, the digital video broadcast-handheld (DVB-H) system, and the integrated services digital broadcast-terrestrial (ISDB-T) system.

The broadcasting receiving module 111 may also be constructed to be suitable not only for the digital broadcasting systems, but also for all broadcasting systems that provide broadcasting signals. At least one of broadcasting signals and/or broadcasting-associated information, which are received through the broadcasting receiving module 111, may be stored in the memory 160.

In addition, the mobile communication module 113 transmits and receives radio signals to and from at least one of a base station, an external terminal, and a server over a mobile communication network. The radio signals may include voice call signals, video call signals, or various forms of data according to a transmission/reception of text/multimedia messages.

Further, the wireless Internet module 115 corresponds to a module for accessing the wireless Internet. The wireless Internet module 115 can be installed in the mobile terminal 100 or be external to the mobile terminal 100. Also, the short-range communication module 117 corresponds to a module for performing short-range communication.

Local area communication technology include technologies such as Bluetooth, radio frequency identification (RFID), infrared data association (IrDA), ultra wideband (UWB), ZigBee or the like. Further, the GPS module 119 receives position information from a plurality of GPS satellites, and the A/V input unit 120 inputs audio signals or video signals and in one embodiment includes a camera 121, and a microphone 123.

The camera 121 processes image frames, such as still images or motion images, which are captured by an image sensor during a video call mode or capturing mode. The processed image frames can then be displayed on a flexible display 151. Further, image frames processed by the camera 121 can be stored in the memory 160 or externally transmitted through the wireless communication unit 110. A plurality of the cameras 121 may also be provided according to different configurations of the terminal.

Also, the microphone 123 receives external sound signals in a call mode, a recording mode, a voice recognition mode, etc. and converts the received sound signals into electrical voice data. In the call mode, the processed voice data is converted into a specified format and transmitted to a mobile communication base station through the mobile communication module 113, and then output.

In addition, the microphone 123 can include a variety of noise removal algorithms for removing noise occurring in the process of receiving external sound signals. The user manipulating portion 130 can also be used to key entry data input by a user to control the operation of the terminal. The user manipulating portion 130 may also include a keypad, a dome switch, a touch pad (static pressure/capacitance), a jog wheel, a jog switch, a finger mouse or the like.

Also, the sensing unit 140 senses a current status of the mobile terminal 100, such as a closed state of the mobile terminal 100, the position of the mobile terminal 100, whether or not a user touches the mobile terminal 100, etc. and generates a sensing signal for controlling the operation of the mobile terminal 100. For example, when the mobile terminal 100 is a slide phone type, the sensing unit 140 can sense whether or not the slide phone is opened.

The sensing unit 140 can also sense whether or not the power supply unit 190 supplies power, whether the interface unit 170 is connected to an external device, etc. As shown in FIG. 1, the sensing unit 140 includes an acceleration sensor 142 that converts a change of acceleration in any one direction into an electrical signal. The acceleration sensor 142 may also include various types of sensors such a sensor used to measure a high acceleration, a sensor used to sense a collision, etc.

In addition, the acceleration sensor 142 generally has two or three axes mounted in one package or only a Z axis depending on the use of the terminal. When an X-axis or Y-axis acceleration sensor is used instead of a Z-axis direction sensor, an additional patch board may be provided such that the acceleration sensor can be mounted upright in a main board.

Further, the sensing unit 140 also includes a gravity sensor 143 that senses the rotation state of the mobile terminal. The gravity sensor 143 corresponds to a weight coupled to a variable resistor and be configured to sense a current rotation state of the terminal according to a change in resistance due to the rotation of the terminal, or corresponds to a conductive object at its center and be configured to sense the rotation state of the terminal in response to a direction into which the conductive object is brought in contact with the terminal in response to the rotation.

The sensing unit 140 also includes a terrestrial magnetic sensor 144 for sensing the magnetism of the earth. Thus, if an output value of the terrestrial magnetic sensor 144 is used, the terrestrial magnetic sensor 144 can be used as an electronic compass and can also used to calculate an azimuth angle, for example.

Further, the sensing unit 140 includes a position sensor 145 for sensing information about the position of the mobile terminal and a position set by a user. The position sensor 145 can also use a position location service, a public safety service, a position-based information service and so on. The position sensor 145 may also be used to obtain position information using the GPS service, a location based service (LBS), a geographical information system (GIS) and so on.

In addition, the output unit 150 outputs audio signals, video signals or alarm signals and includes the flexible display 151, a sound output module 153, an alarm unit 155, and a vibration module 157. Also, the flexible display 151 displays and outputs information processed in the mobile terminal 100.

For example, when the mobile terminal 100 is in the call mode, the flexible display 151 displays a user interface (UI) or a graphic user interface (GUI), which is pertinent to the call. When the mobile terminal 100 is in a video call mode or a capturing mode, the flexible display 151 displays captured or received images individually or simultaneously and also displays a UI or a GUI.

Meanwhile, when the flexible display 151 and a touch pad form a mutually layered structure and is constructed as a touch screen as described above, the flexible display 151 can also be used as an input device other than an output device. Further, the touch screen includes a touch screen panel, a touch screen panel controller and so on. In addition, the touch screen panel can include a transparent panel attached to the outside and be connected to an internal bus within the mobile terminal 100.

The touch screen panel also continues to monitor whether there is a touch input, and when there is a touch input, sends corresponding signals to the touch screen panel controller. The touch screen panel controller then processes the corresponding signals received from the touch screen panel and transmits the corresponding data to the controller 180. Thus, the controller 180 can determine when there has been a touch input or which area of the touch screen has been touched.

Further, the flexible display 151 includes at least one of a liquid crystal display, a thin film transistor-liquid crystal display, an organic light-emitting diode, and a 3-dimensional display. Two or more flexible display units 151 may also be used. For example, the mobile terminal 100 can include an external display and an internal display.

The sound output module 153 outputs audio data received from the wireless communication unit 110 in the incoming call mode, the call mode, the record mode, the voice recognition mode, the incoming broadcasting mode or the like or audio data stored in the memory 160. The sound output module 153 also outputs sound signals pertinent to the functions performed in the mobile terminal 100, for example, outputting a sound for a received call signal and a sound for a received message. The sound output module 153 includes, for example, a speaker, a buzzer or the like.

In addition, the alarm unit 155 outputs signals to inform the occurrence of events in the mobile terminal 100. For example, the events occurring in the mobile terminal 100 may include an incoming call signal, a received message an entered key signal input and so on. The alarm unit 155 can also output signals to inform the occurrence of events in different ways other than audio or video signals. For example, the alarm unit 155 can output signals in a vibration form. Thus, when a call signal is received or a message is received, the alarm unit 155 can output a signal to inform the reception of the call signal or the message.

Alternatively, when a key signal is input, the alarm unit 155 can output a signal as a feedback to the input key signal. Thus, the user can notice the occurrence of an event through a signal output by the alarm unit 155. The occurrence of an event can also be output through the flexible display 151 or the sound output module 153.

In addition, the memory 160 stores programs used by the controller 180 and also functions to temporarily store input or output data (for example, a phonebook, messages, still images, motion images and the like). The memory 160 may include at least one type of storage media including a flash memory type, a hard disk type, a multimedia card micro type, card type memory (for example, SD memory, XD memory, and so on), RAM, and ROM. The mobile terminal 100 can also manage a web storage serving as the storage function of the memory 160 on the Internet.

Further, the interface unit 170 functions as an interface with external devices connected to the mobile terminal 100. Examples of the external devices connected to the mobile terminal 100 include a wired/wireless headset, an external charger, wired/wireless data ports, a memory card, a card socket such as subscriber identification module (SIM)/user identity module (UIM) cards, an audio input/output (I/O) terminal, a video I/O terminal, an earphone, and so on. The interface unit 170 can also receive data or be supplied with power from the external devices, transfer the data or power to respective constituent elements of the mobile terminal 100, and transmit data of the mobile terminal 100 to the external devices.

In addition, the controller 180 controls the overall operation of the mobile terminal 100. For example, the controller 180 performs the appropriate functions for processing a voice call, data communication, video telephony, and so on. As shown in FIG. 1, the controller 180 includes a multimedia play module 181 for playing multimedia. The multimedia play module 181 may include hardware/software within the controller 180 or be separate from the controller 180. Further, the power supply unit 190 is supplied with an external power source or internal power source and supplies power source used for the operation of the each element under the control of the controller 180.

Figure 2:
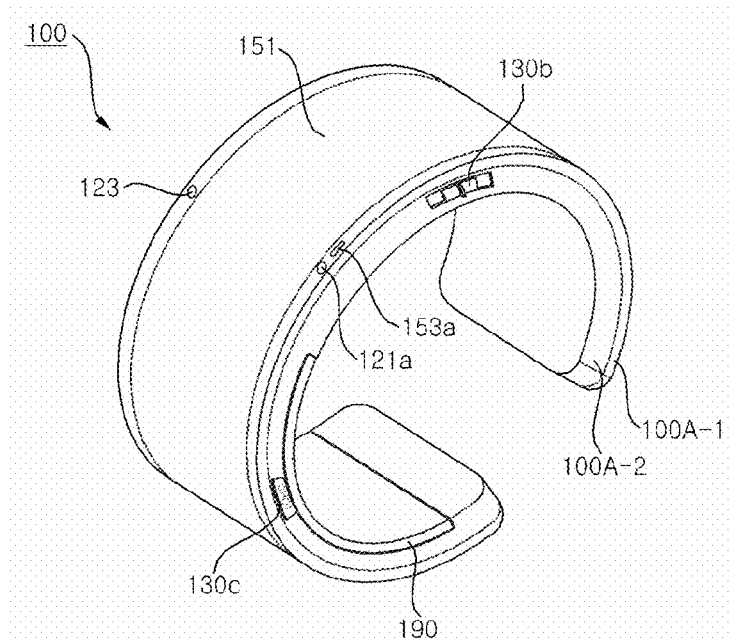
FIG. 2 is a first perspective view of a mobile terminal according to an embodiment of the present invention.

Next, FIG. 2 is a first perspective view of the mobile terminal 100 according to an embodiment of the present invention. As shown in FIG. 2, an external appearance of the mobile terminal 100 includes a front casing 100A-1 and a rear casing 100A-2. The front casing 100A-1 and the rear casing 100A-2 are preferably formed from flexible materials such that the mobile terminal 100 can bend or flex along with the flexible display 151.

A variety of electronic components are also embedded in a space between the front casing 100A-1 and the rear casing 100A-2. At least one middle casing may also be disposed between the front casing 100A-1 and the rear casing 100A-2. Further, the casings can be formed by injecting synthetic resin or can be formed from metal materials such as stainless steel (STS) or titanium (Ti).

Figure 3:
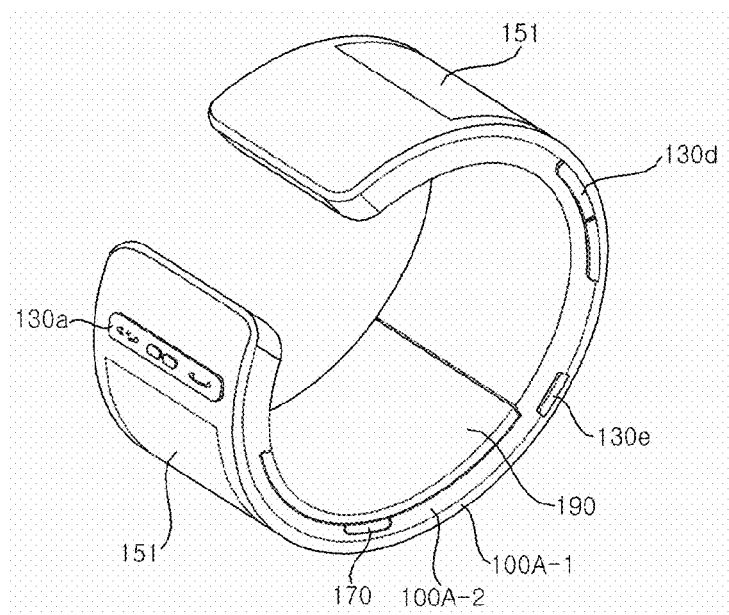
FIG. 3 is a second perspective view of a mobile terminal according to an embodiment of the present invention.

FIGS. 2 and 3 also illustrate the flexible display 151, a first sound output module 153*a* and a first camera 121*a*. FIG. 2 illustrates the mobile terminal 100 including a first user manipulating portion 130*a* disposed in the front casing 100A-1. A second user manipulating portion 130*b*, a third user manipulating portion 130*c*, and a microphone 123 are also disposed on the side of the rear casing 100A-2 as shown in FIGS. 2 and 3.

In addition, the flexible display 151 includes a liquid crystal display (LCD), an organic light-emitting diode (OLED) and the like used for visually displaying information. The flexible display 151 can also include a touch pad overlapped with the flexible display 151 in a layered structure such that the flexible display 151 can operate as a touch screen, thereby allowing the user to input information into the terminal by touching icons, soft keys, etc. on the terminal.

Further, the first sound output module 153a can be a receiver or speaker. The first camera 121a also captures still images or motion images of a user or other objects, and the microphone 123 receives a user's voice, other sound, etc. In addition, the first to third user manipulating portions 130a, 130b, and 130c are also collectively referred to as the user manipulating portion 130.

In addition, the user manipulating portion 130 can be a dome switch or a touch pad, which is able to receive commands or information by pushing or touching the dome switch, a wheel or jog device, a joystick, etc. Further, the first user manipulating portion 130a can be used to input commands such as start, end and call, and the second user manipulating portion 130b can be used to select an operating mode, etc. The third user manipulating portion 130c can operate as a hot key for activating special functions within the mobile terminal 100.

FIG. 3 also illustrates a fourth user manipulating portion 130d, a fifth user manipulating portion 130e, and the interface unit 170 disposed on the side of the rear casing 100A-2. A second sound output module can also be disposed in the rear casing 100A-2 so as to provide a stereo function together with the first sound output module 153a. The second sound output module can also be used in a speakerphone mode.

In addition, an antenna for receiving broadcasting signals, other than an antenna for a call, etc., can also be disposed on one side of the rear casing 100A-2. The antenna may be drawn out from the rear casing 100A-2. Further, the interface unit 170 is a passage through which the mobile terminal 100 can exchange data, etc. with external devices.

For example, the interface unit 170 can be a connector for connecting to an earphone, a port for short-range communications, and power supply terminals for supplying power to the mobile terminal 100 in a wired or wireless manner The interface unit 170 can also be a card socket for accommodating external cards, such as a subscriber identification module (SIM) or a user identity module (UIM), and a memory card for storing information.

Further, the power supply unit 190 supplies power to the mobile terminal 100 and in this embodiment is mounted on the part of the rear casing 100A-2. The power supply unit 190 can be, for example, a rechargeable battery and can be detachably coupled to the rear casing 100A-2 for charging purposes, etc.

Figure 4:
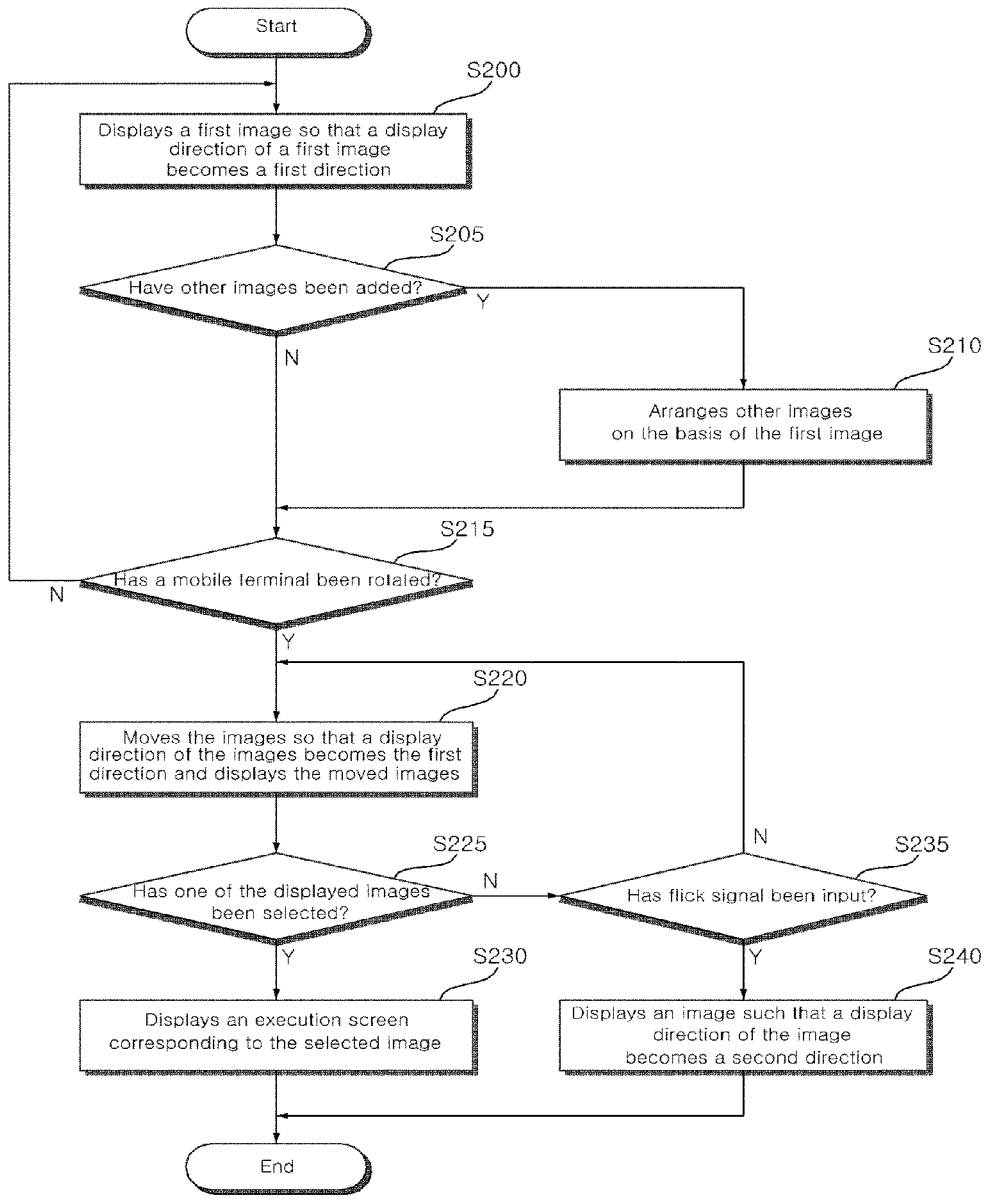
FIG. 4 is a flowchart illustrating a method of controlling an operation of a mobile terminal according to a first embodiment of the present invention.

Next, FIG. 4 is a flowchart illustrating a method of controlling an operation of the mobile terminal according to a first embodiment of the present invention. FIG. 1 will also be referred to throughout the description of the invention. As shown in FIG. 4, the controller 180 controls a first image to be displayed on the curve-shaped flexible display 151 such that a display direction of the first image is in a first direction (S200).

In addition, the first direction can be set by a user and generally corresponds to a direction toward the eyes of the user such that the user can easily view the first image. For example, when the mobile terminal is a wrist watch mobile terminal as shown in FIGS. 2 and 3, the first direction may correspond to the image being displayed at center portion of the terminal when the user first looks at the time, for example.

In addition, in the following description of the embodiments of the present invention, the first image can be an image stored in the mobile terminal, video, text, a standby screen, a menu execution screen, a menu icon for selecting a menu, a menu screen set by a user according to use frequency, etc. The first image can also be displayed in a small size on one area of the flexible display 151.

The controller 180 then determines whether other images to be displayed on the flexible display 151 have been added (S205). If other images have been added (Yes in S205), the controller 180 arranges and displays the other images with respect to the first image (S210). The other images may also include stored images, video, text, a standby screen of the mobile terminal, an execution screen of a menu, a menu icon for selecting a menu and so on. Further, the image arrangement may be a plurality of images in which menu screens are arranged in order of higher use frequency in both directions based on the first image.

However, if the controller 180 determines other images have not been added (No is S205) or after the images have been arranged in step S210, the controller 180 determines whether the mobile terminal has been rotated based on a value output from the acceleration sensor 142 (S215). If the mobile terminal has not been rotated (No in S215), the first image or the arrangement of images are not moved. However, if the controller 180 determines the mobile terminal has been rotated (Yes in S215), the controller 180 moves the first image (or arranged images) so that the display direction of the first image is maintained in the first direction in response to a rotation degree of the mobile terminal based on a value output from the acceleration sensor 142 (S220). Accordingly, even when the mobile terminal is rotated, the display direction of the first image is maintained in the first direction.

The controller 180 then determines whether one of the images displayed on the flexible display 151 has been selected (S225). If an image has been selected (Yes in S225), the controller 180 displays an execution screen corresponding to the selected image on the flexible display 151 (S230). For example, when the selected image is a keyboard execution menu, the controller 180 displays a Qwerty input window on the flexible display 151.

However, if the controller 180 determines an image has not been selected (No in S225), the controller 180 determines whether a flick signal has been input through one of the images displayed on the flexible display 151 (S235). If a flick signal has not been input (No in S235), the controller 180 does not move the first image or arranged images displayed in step S220 (S220).

However, if the controller 180 determines a flick signal has been input (Yes in S235), the controller 180 moves and displays the image to which the flick signal has been input such that the display direction of the image is in a second direction in response to the input flick signal (S240). Also, if the image to which the flick signal has been input is one of the images included in the image arrangement displayed in step S210, the image arrangement is moved and displayed with an arranged sequence maintained according to the image moved in step S240. The flickering signal also corresponds to the user flickering a portion of the display 151 with their finger, etc.

Figure 5:
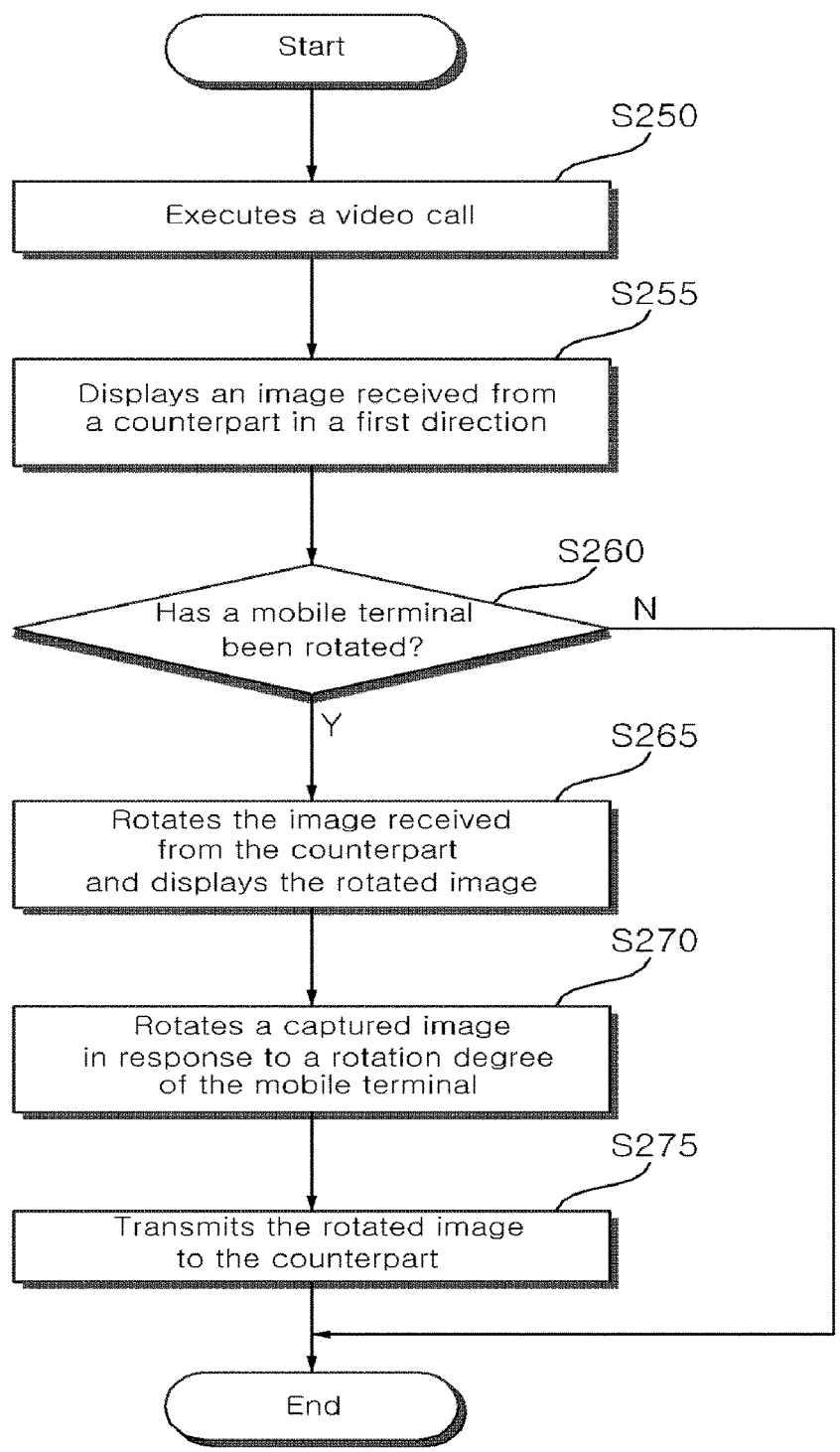
FIG. 5 is a flowchart illustrating a method of controlling an operation of a mobile terminal according to a second embodiment of the present invention.

Next, FIG. 5 is a flowchart illustrating a method of controlling an operation of the mobile terminal according to a second embodiment of the present invention. As shown in FIG. 5, the controller 180 executes a video call in which the camera 121 captures an image of the user (S250). This embodiment also refers to simple transmission and reception of an image such as a photograph, video or text.

Next, the controller 180 displays an image received from a counterpart on the flexible display 151 in a first direction (S255). For example, the first direction can be a length direction of the flexible display 151. The controller 180 then determines whether the mobile terminal has been rotated based on a value output from the acceleration sensor 142 (S260). If the mobile terminal has not been rotated (No in S260), the controller 180 does not move the image displayed in step S255.

However, if the mobile terminal has been rotated (Yes in S260), the controller 180 rotates and displays the image received from the counterpart in response to a rotation degree of the mobile terminal (S265). In addition, the image received from the counterpart may be rotated so that the up and down directions of the image are always constant based on a user's sight. For example, when the mobile terminal is rotated 90 degrees, the controller 180 rotates the image received from a counterpart—90 degrees and displays the rotated image so that the up and down directions of the image are always maintained constant.

The controller 180 also rotates and displays the image captured in step S250 in response to the rotation degree of the mobile terminal (S270), and then transmits the image rotated in step S270 to the counterpart (S275). Further, for a video call, the controller 180 can transmit the rotated image in real-time. In addition, when the mobile terminal is rotated 90 degrees, the controller 180 can rotate a lens of the camera 121 90 degrees and therefore a captured image is rotated 90 degrees. Accordingly, a counterpart can view an image whose up and down directions are always constant.

Figure 6:
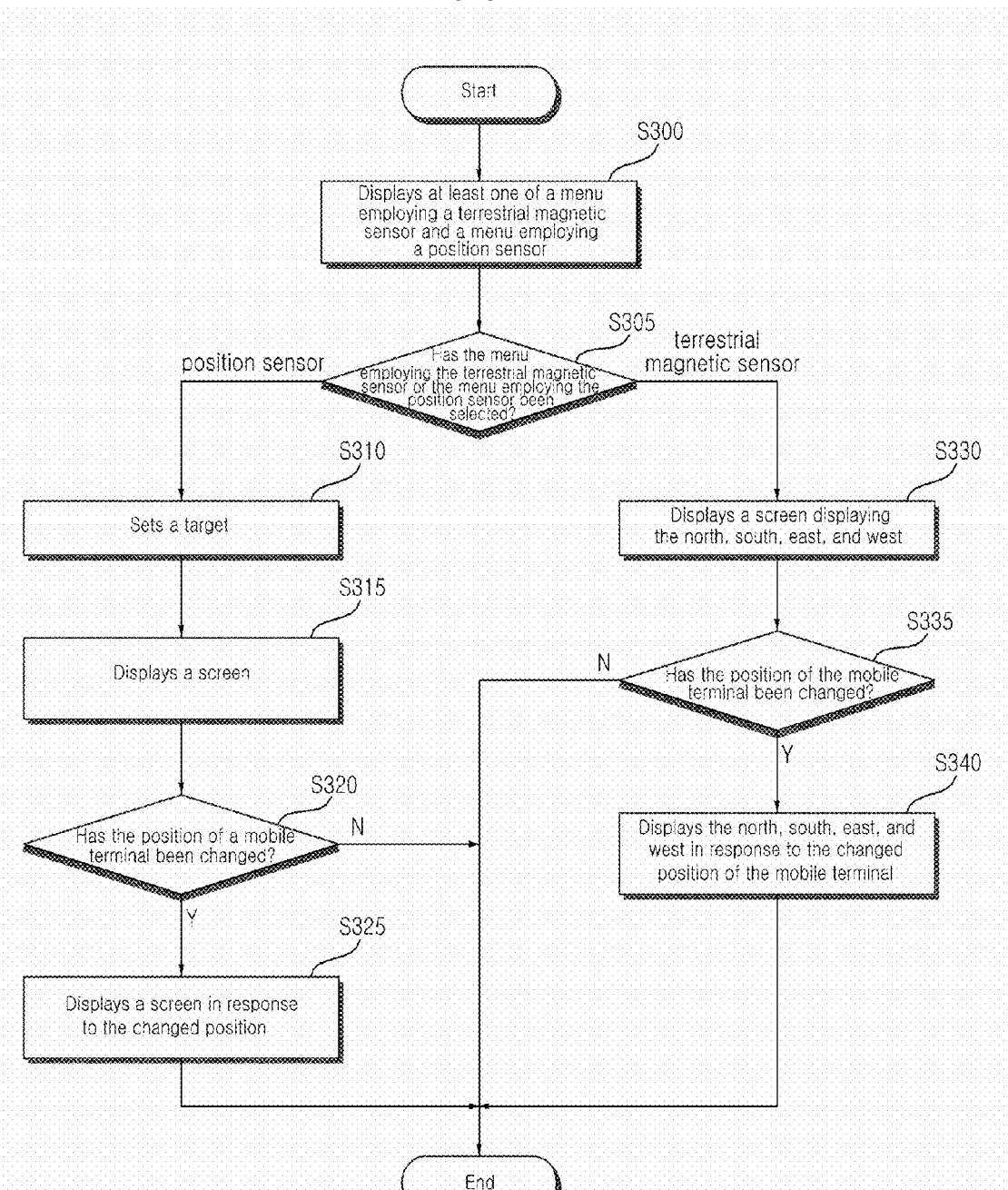
FIG. 6 is a flowchart illustrating a method of controlling an operation of a mobile terminal according to a third embodiment of the present invention.

Next, FIG. 6 is a flowchart illustrating a method of controlling an operation of the mobile terminal according to a third embodiment of the present invention. As shown in FIG. 6, the controller 180 displays at least one of a menu employing the terrestrial magnetic sensor 144 and a menu employing the position sensor 145 (S300). The controller 180 then determines whether the menu employing the terrestrial magnetic sensor 144 or the menu employing the position sensor 145 has been selected (S305).

If the controller 180 determines the menu employing the position sensor 145 has been selected, the controller 180 sets a target according to the input of a user (S310). Next, the controller 180 displays a screen including at least one of a position, direction, and distance of the target set in step S310 based on a current position of the mobile terminal (S315). Further, the screen displayed in step S315 can include a map for indicating a target position, an optimal path and/or a shortest path from a current position of the mobile terminal to the target position, and so on.

The controller 180 then determines whether the position of the mobile terminal has been changed (S320). If the position of the mobile terminal has not been changed (No in S320), the controller 180 does not change the screen displayed on the flexible display 151. However, if the position of the mobile terminal has been changed (Yes in S320), the controller 180 displays a screen including at least one of a position, direction and distance of the target set in step S310 in response to the changed position of the mobile terminal (S325).

Also, when a distance between the mobile terminal and the target is reduced to a specific distance or less, the controller 180 can output a vibration or alarm sound. Similarly, when a distance between the mobile terminal and the target is increased to a specific distance or more, the controller 180 can output a vibration or alarm sound.

Further, if the controller 180 in step S305 determines the menu employing the terrestrial magnetic sensor 144 has been selected, the controller 180 displays a screen including the North, South, East, and West on the flexible display 151 (S330). The screen displayed in step S330 can also include a nap. Next, the controller 180 determines whether the position of the mobile terminal has been changed (S335).

If the position of the mobile terminal has not been changed (No in S335), the controller 180 does not change the screen displayed on the flexible display 151. However, if the controller 180 determines the position of the mobile terminal has been changed (Yes in S335), the controller 180 moves and displays the North, South, East, and West in response to the changed position of the mobile terminal (S340).

Further, the controller 180 can control the display direction of the screen displayed in step S315 and the screen displayed in step S330 to be in a constant first direction. As discussed above, the first direction can be set by a user or can be an upward vertical direction from the surface of the Earth.

Figure 7:
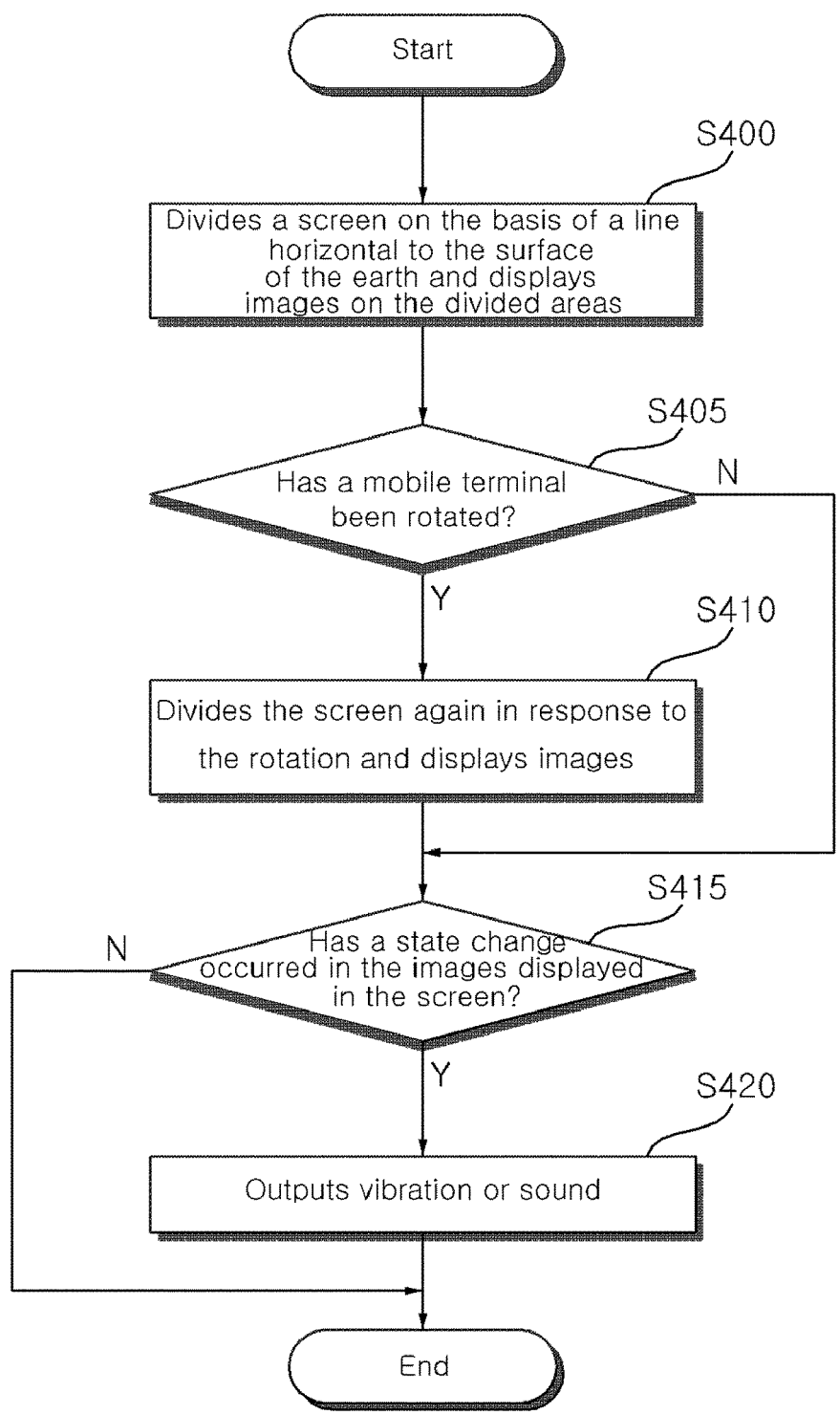
FIG. 7 is a flowchart illustrating a method of controlling an operation of a mobile terminal according to a fourth embodiment of the present invention.

Next, FIG. 7 is a flowchart illustrating a method of controlling an operation of the mobile terminal according to a fourth embodiment of the present invention. As shown in FIG. 7, the controller 180 divides a screen displayed on the flexible display 151 into an upper area and a lower area based on a specific line horizontal to the surface of the Earth and displays images in the divided areas (S400).

The controller 180 then determines whether the mobile terminal has been rotated based on a value output from the gravity sensor 143 (S405). If the mobile terminal has been rotated (Yes in S405), the controller 180 divides the screen again into an upper area and a lower area based a specific line horizontal to the surface of the Earth in response to the degree of rotation and displays images on the re-divided areas (S410).

In addition, each of the re-divided upper and lower areas of the screen has a same or similar area as that of the upper and lower areas divided in step S400. For example, when an image of air and clouds is displayed in the upper area and an image of water including fish is displayed in the lower area, the image of air and clouds will always be displayed in the upper area and the image of water and fish will be always be displayed in the lower area always based on the boundary area horizontal to the surface of the Earth even when the mobile terminal has been rotated.

Next, the controller 180 determines whether the displayed images have changed (S415). If the controller 180 determines one or both of the displayed images have changed (Yes in S415), the controller 180 outputs a vibration or sound (S420). However, if the images have not been changed (No in S415), the controller 180 maintains the screen displaying the two images and does not output a vibration or sound.

Figure 8:
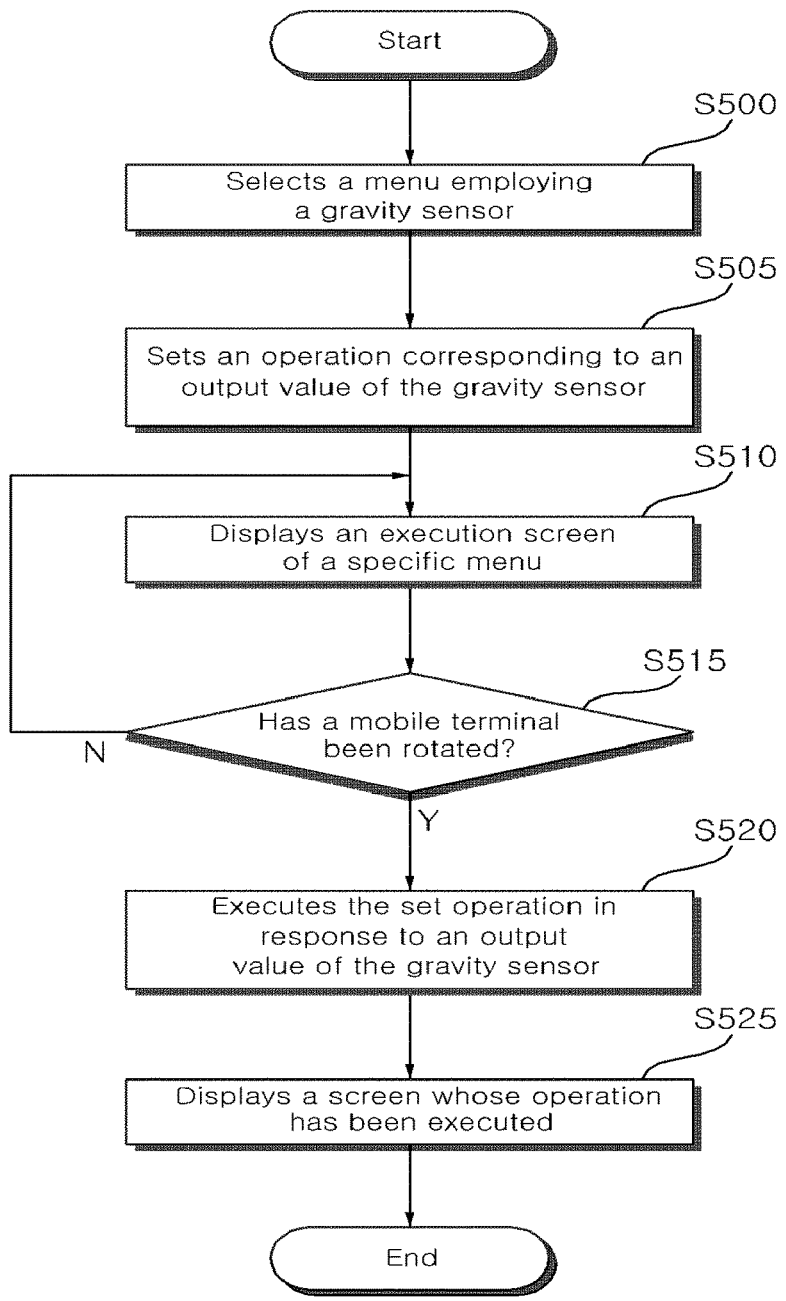
FIG. 8 is a flowchart illustrating a method of controlling an operation of a mobile terminal according to a fifth embodiment of the present invention.

Next, FIG. 8 is a flowchart illustrating a method of controlling an operation of a mobile terminal according to a fifth embodiment of the present invention. As shown in FIG. 8, the user selects a menu employing the gravity sensor 143 (S500). The controller 180 then sets an operation corresponding to an output value of the gravity sensor 143 according to the user' selection (S505). For example, the operation corresponding to the output value of the gravity sensor 143 can be a screen change, a sound change, etc. of a menu, which is currently being executed, also and be a change to finish a menu, which is currently being executed.

The controller 180 then displays an execution screen of a specific menu on the flexible display 151 (S510). The controller 180 also determines whether the mobile terminal has been rotated based on a value output from the gravity sensor 143 (S515). If the mobile terminal has not been rotated (No in S515), the controller 180 does not change the execution screen of the specific menu displayed in step S510.

However, if the mobile terminal has been rotated (Yes in S515), the controller 180 executes the operation set in step S505 in response to a value output from the gravity sensor 143 (S520). The controller 180 also displays a screen whose operation has been executed on the flexible display 151 (S525). For example, when a music play screen is displayed, and the mobile terminal is rotated, the controller 180 can change the volume of the music according to a rotation degree of the terminal. Alternatively, the controller 180 can stop the play of music and display a new menu for transmission and reception of a text message, video play, and a call. Further, the controller 180 maintains a display direction of the executed screen to always be constant.

Figure 9:
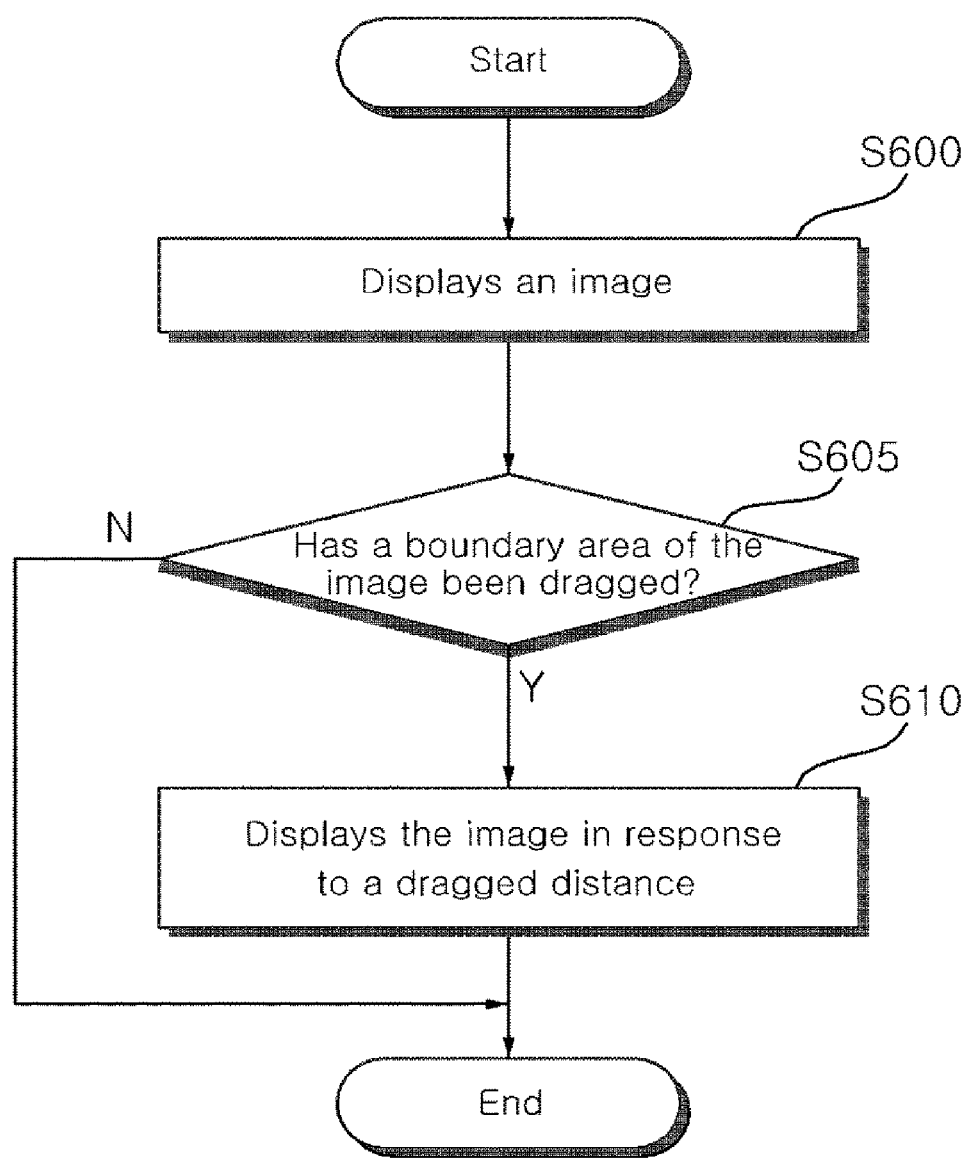
FIG. 9 is a flowchart illustrating a method of controlling an operation of a mobile terminal according to a sixth embodiment of the present invention.

Next, FIG. 9 is a flowchart illustrating a method of controlling an operation of a mobile terminal according to a sixth embodiment of the present invention. As shown in FIG. 9, the controller 180 displays an image on the flexible display 151 (S600). Again, the image can be a still image, video, text or a menu icon stored in the mobile terminal. For example, the image can be a web page screen of a web browser or a keypad screen.

The controller 180 then determines whether a signal has been input indicating that a boundary area of the image has been touched & dragged (S605). If the touch and drag signal has not been input (No in S605), the controller 180 does not change the image displayed on the flexible display 151.

However, if the touch and drag signal has been input (Yes in S605), the controller 180 redisplays the image in response to a dragged distance (S610). Further, the display direction of the center of the image is maintained constant. For example, when the boundary area of the image is dragged in a direction external to the image, the controller 180 enlarges the image in accordance with the dragged distance. Similarly, when the boundary area of the image is dragged in a direction internal to the image, the controller 180 shrinks or reduces the image in accordance with the dragged distance.

Figure 10:
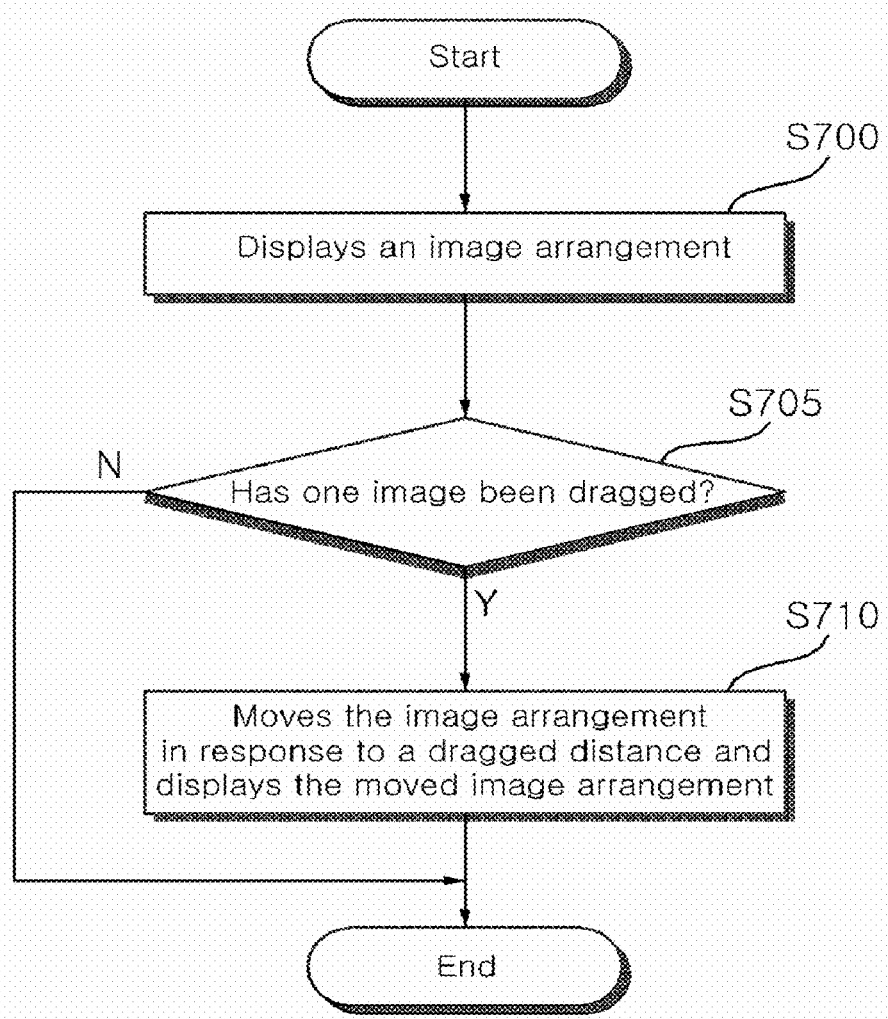
FIG. 10 is a flowchart illustrating a method of controlling an operation of a mobile terminal according to a seventh embodiment of the present invention.

Next, FIG. 10 is a flowchart illustrating a method of controlling an operation of a mobile terminal according to a seventh embodiment of the present invention. As shown in FIG. 10, the controller 180 displays an image arrangement including one or more images on the flexible display 151 (S700).

The controller 180 then determines whether a signal has been input indicating that one image of the image arrangement has been touched & dragged (S705). If the touch and drag signal has not been input (No in S705), the controller 180 maintains the image arrangement on the flexible display 151.

However, if the touch and drag signal has been input (Yes in S705), the controller 180 moves and displays the image arrangement in response to the dragged distance (S710). In other words, the controller 180 moves the image arrangement as much as the dragged distance. For example, the user may drag and move an image arrangement including a character screen, a web page screen, and a directory screen, such that the character screen is disposed in front of the user' sight in the image arrangement.

Figure 11:
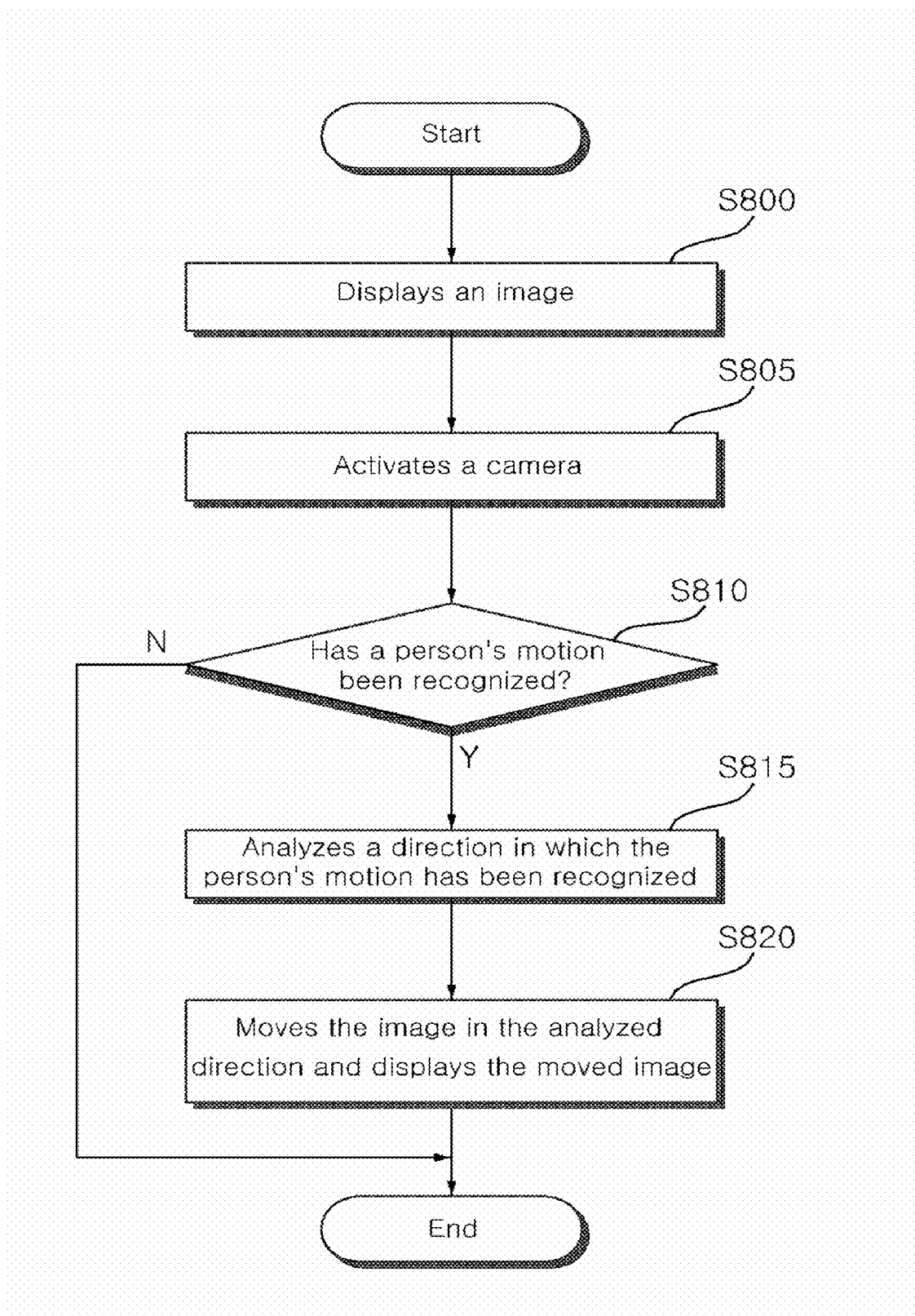
FIG. 11 is a flowchart illustrating a method of controlling an operation of a mobile terminal according to an eighth embodiment of the present invention.

FIG. 11 is a flowchart illustrating a method of controlling an operation of a mobile terminal according to an eighth embodiment of the present invention. As shown in FIG. 11, the controller 180 displays an image on the flexible display 151 (S800), and activates the camera 121 (S805). The controller 180 then determines whether a person's movement has been recognized through the camera 121 (S810). If the person's movement has not been recognized (No in S810), the controller 180 does not change the displayed image.

However, if the person's movement has been recognized (Yes in S810), the controller 180 analyzes a direction in which the person's movement has been recognized (S815). Next, the controller 180 moves and displays the image in the analyzed direction (S820). That is, the controller 180 moves and displays the image so that the analyzed direction is the display direction of the image.

Next, FIGS. 12-21 are overviews of mobile terminals for illustrating the methods of controlling the operation of the mobile terminal according to the above-described embodiments of the present invention.

Figure 12:
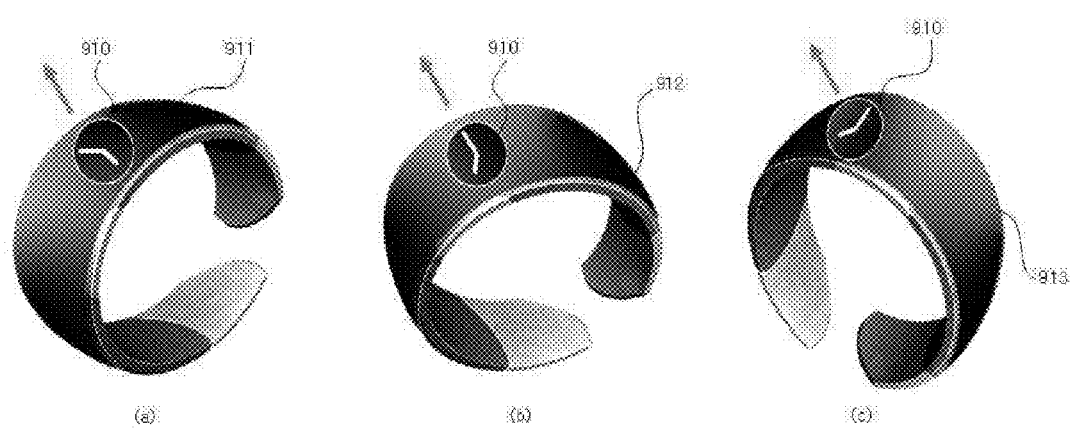
FIGS. 12-21 are overviews of mobile terminals for illustrating the embodiments described in the flowcharts of FIGS. 4-11.

As shown in FIG. 12(*a*), the controller 180 displays an image of a watch 910 on the flexible display 151. Further, FIG. 12(*a*) illustrates the display direction of the watch 910 being in a first direction. That is, in this example, the first direction is assumed to be directed to the user's eyes or sight.

Then, as shown in FIG. 12(*b*), when the mobile terminal has been rotated, the controller 180 moves the watch image 910 in correspondence with the movement of the mobile terminal. Thus, the display direction of the watch 910 is maintained in the first direction.

Further, as shown in FIG. 12(*c*), when the mobile terminal is again rotated, the controller 180 again moves the watch image 910 in correspondence with the movement of the mobile terminal. Thus, the display direction of the watch image 910 is always maintained in the first direction.

Figure 13:
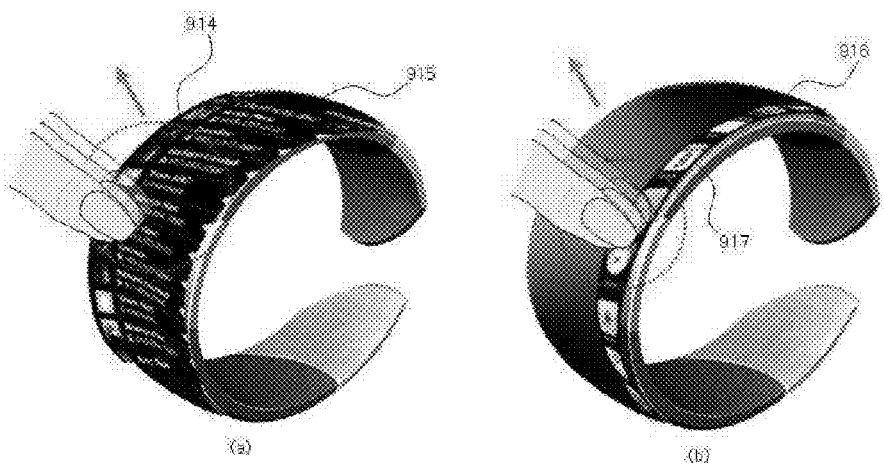

Next, FIG. 13(*a*) illustrates a situation in which the user performs a flicking operation on an image or images displayed on the flexible display 151. In this example, the image includes a directory listing 914 of different people, businesses, etc. As shown in FIG. 13(*a*), when the user flicks the displayed image or images, the controller 180 moves or scrolls the displayed image or images in an amount corresponding to the amount of the flicking operation.

Figure 14:
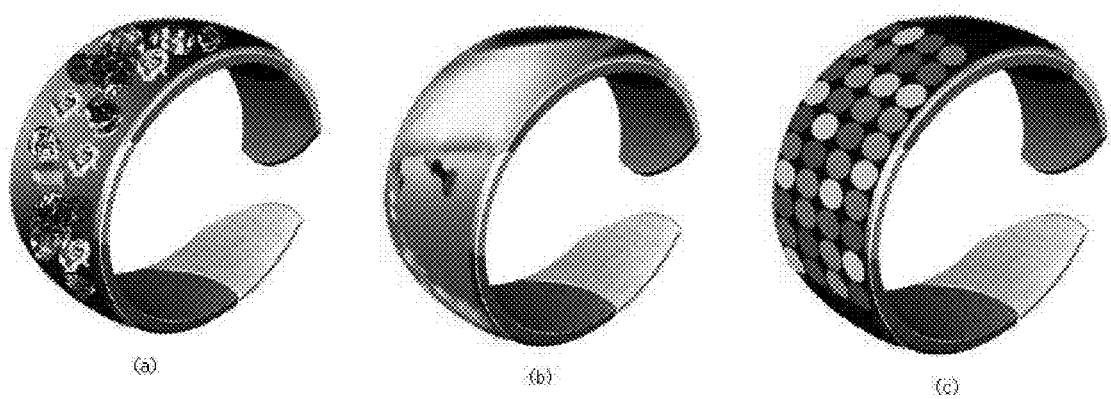

Further, FIG. 13(*b*) illustrates the controller 180 displaying a menu icon arrangement 917 including one or more menu icons only on a part of the flexible display 151. FIG. 14(*a*)-14(*c*) illustrates the controller 180 displaying an image as a jewelry pattern, a divided sea/cloud effect, and circular decoration effect, respectively, on the flexible display 151.

Figure 15:
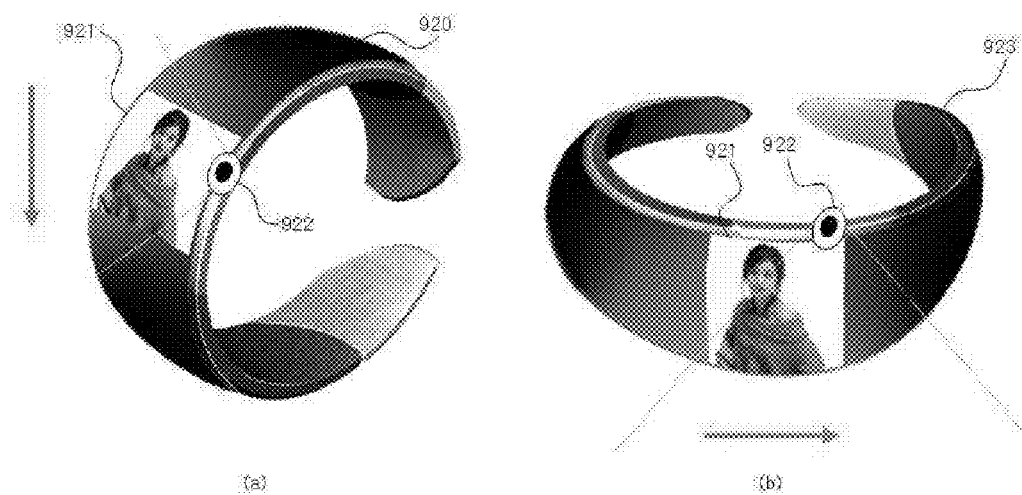

Next, FIGS. 15(*a*) and 15(*b*) are overviews of a mobile terminal corresponding to a bracelet according to another embodiment of the present invention. As shown in FIG. 15(*a*), the mobile terminal includes a camera 922 that is used to capture an image of a first user during a video call with a second user, for example. The controller 180 also displays an image 921 transmitted from the second user in a first direction (i.e., in a direction facing the first user) on the flexible display 151.

Then, as shown in FIG. 15(*b*), when the first user rotates the mobile terminal 90 degrees, for example, the controller 180 rotates the image 921 of the second user 90 degrees such that the image of the second user is still displayed in the first direction. Further, the controller 180 also rotates a lens of the camera 922 90 degrees together with the mobile terminal. Accordingly, the users conducting the video call can view each other in a same direction even though the terminal is rotated.

Figure 16:
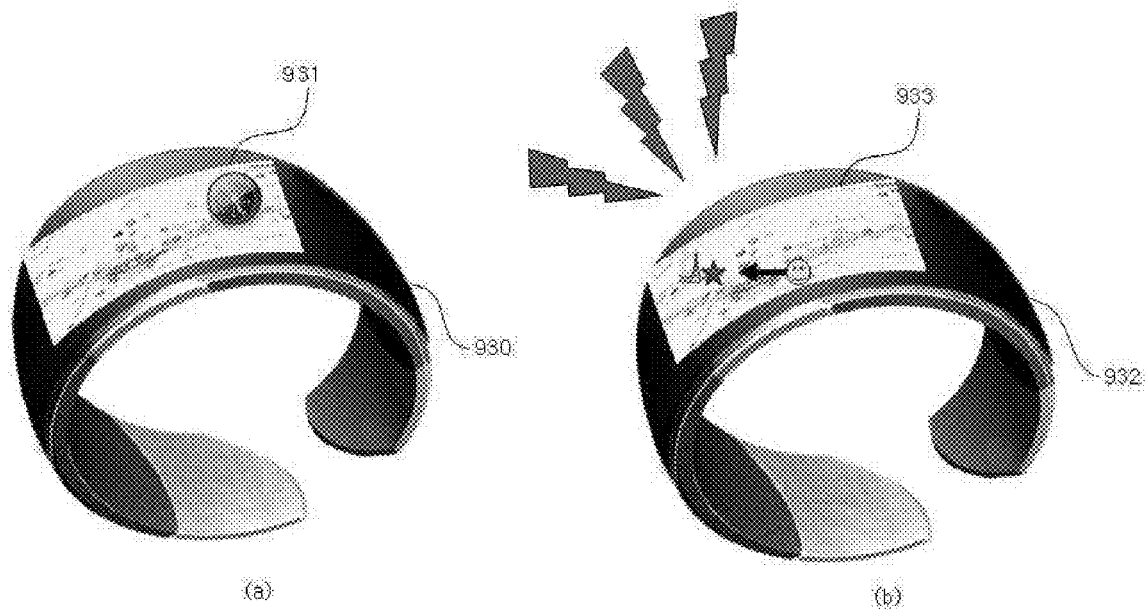

Next, FIGS. 16(*a*) and 16(*b*) are overviews of a mobile terminal corresponding to a bracelet according to another embodiment of the present invention. In the embodiment shown in FIG. 16(*a*), the controller 180 displays a map 931 indicating a current position and surrounding positions of the mobile terminal on the flexible display 151. The controller 180 also displays the North, South, East, and West directions on the map 931. As discussed above, this function can be activated when the user selects the menu employing the position sensor 145.

Alternatively, as shown in FIG. 16(*b*), the controller 180 displays a map 933 indicating a direction of a set target position and indicating a current position and surrounding positions of the mobile terminal. FIG. 16(*b*) also illustrates the controller 180 outputting a vibration or alarm according to a position change between a set target position and a mobile terminal. As previously discussed, the map 933 can be displayed when the user selects a menu employing the terrestrial magnetic sensor 144.

Figure 17:
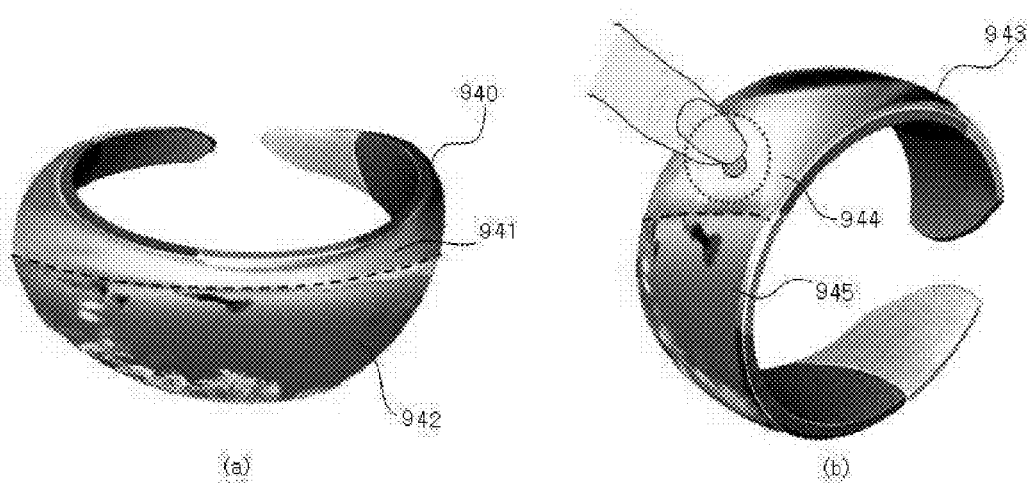

Next, FIGS. 17(*a*) and 17(*b*) are overview of a mobile terminal corresponding to a bracelet according to yet another embodiment of the present invention. As shown in FIG. 17(*a*), the controller 180 displays a video 942 which is divided into an upper area and a lower area corresponding a surface horizontal to the surface of the Earth. Further, the controller 180 displays a sky image 941 in the upper area and an ocean or sea environment 943 in the lower area.

Also, the ocean or sea environment 943 can include fish or other sea creatures that are moving in the video 942. Clouds can also be moving in the sky image 941. Then, as shown in FIG. 17(*b*), when the mobile terminal is rotated, the controller 180 also rotates the video 942 and divides the video 942 into an upper area and a lower area based on a specific line horizontal to the surface of the Earth such that the area of each of the upper area and the lower area is identical or similar to that of each of the upper area and the lower area shown in FIG. 17(*a*). Accordingly, the controller 180 rotates and displays the video 942 to have the upper and lower areas 941 and 943 such that the viewing direction of the video for the user is maintained in the first direction.

Further, in FIG. 17(*b*), the user touches an area 944 above the lower area including the fish to produce an effect such that the user is feeding the fish. In this example, the controller 180 recognizes the user is touching in the upper area and makes the fish move as if they were being fed. The controller 180 can also output sound effects corresponding the actions performed with the fish (a vibrating effect, etc.)

Figure 18:
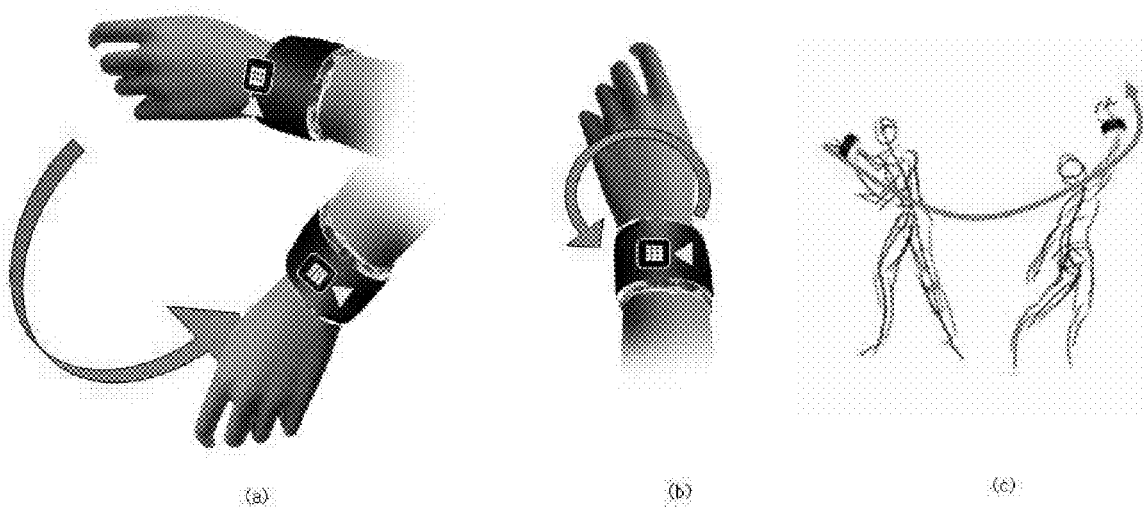

Next, FIGS. 18(*a*)-18(*c*) are overviews of the mobile terminal corresponding to a bracelet according to another embodiment of the present invention. In this embodiment, when the mobile terminal attached to the user's wrist is rotated, the controller 180 performs or executes a preset operation based on a value output from the gravity sensor 143. For example, as shown in FIG. 18(*a*), when music is being played, the user can have a next song played by moving or shaking his arm. Alternatively, as shown in FIG. 18(*b*), the user can have the controller 180 perform a preset operation by rotating their wrist. For example, the user can receive an incoming call by rotating their wrist. Meanwhile, when a degree in which the arm is moved is greater than that of FIG. 18(*a*) and as shown in FIG. 18(*c*), the controller 180 can execute a preset operation such as transmitting a message.

In addition, the user can preset what operations are to be performed with what movement or action using the appropriate menu options provided with the mobile terminal according to an embodiment of the present invention. For example, the user can first set a particular operation or function (e.g., switch songs, receive calls, etc.) in an initial set-up mode, and then perform a specific action such as rotating the mobile terminal, shaking the mobile terminal, etc.

The controller 180 then matches the action with the specified operation, and performs the operation whenever the user performs the specific action. The user can also set a plurality of functions to be executed based on a specific action. For example, the user can set all text messages be removed, all voice mails be removed, and all outgoing and incoming calls be removed based on a shaking action of the terminal. Thus, the user can quickly delete all history call records, etc. with a simple action.

Figure 19:
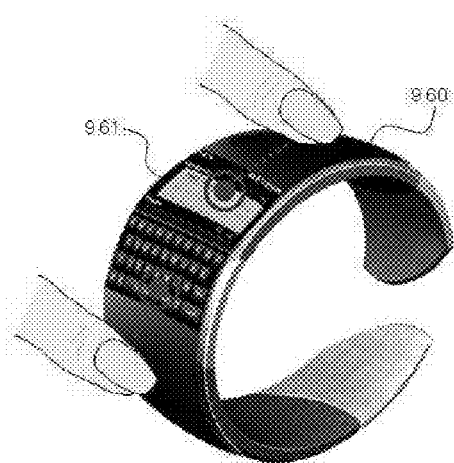
Figure 20:
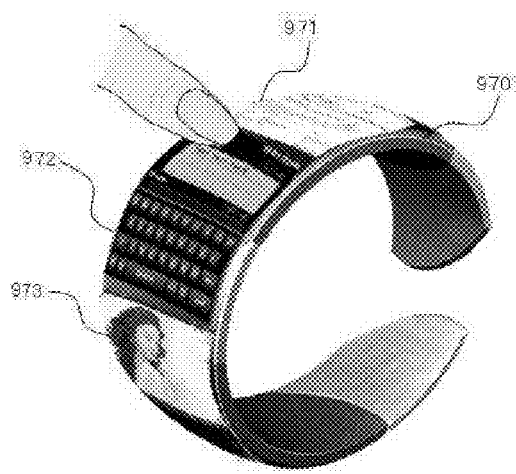

Next, FIG. 19 illustrates the controller 180 displaying a keyboard 961 on the flexible display 151. Further, as shown in FIG. 19, the user is enlarging the keyboard 961 by touching and dragging portions of the keyboard 961. FIG. 20 illustrates the controller 180 displaying an image arrangement including a web page 971, a Qwerty keyboard 972, and a photograph 973 on the flexible display 151. FIG. 20 also illustrates the user touching and dragging one portion of the Qwerty keyboard 972, such that the image arrangement is moved in response to a dragged distance. In this instance, the controller 180 moves all images in the arrangement and does not change an arrangement order of the images included in the image arrangement.

Figure 21:
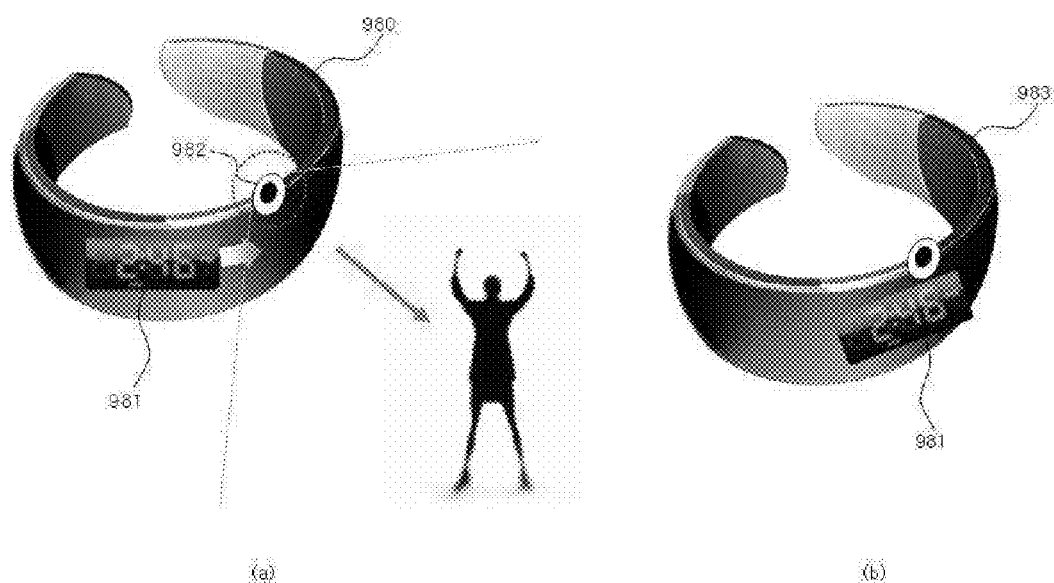

Next, FIGS. 21(*a*) and 21(*b*) illustrate the controller 180 moving an image based on a user's motion. In particular, FIG. 21(*a*) illustrates the image being a digital clock image 981 on the flexible display 151. The mobile terminal also includes a camera 982 that senses a user's motion. Then, as shown in FIG. 21(*b*), the controller 180 moves the image 981 to face the user.

Further, in the above embodiments, the user can initially set the first direction of the image by touching and dragging the image to a particular location on the display 151. The controller 180 then sets this position to be the first direction.

In addition, both edges of the mobile terminal are separated in the above-described embodiments. However, both edges or sides of the terminal can also be connected together. When the edges of the flexible display 151 are connected together, the controller 180 can recognize the connection as move the image across the connection.

That is, if a first side and a second side of the flexible display 151 are connected, a graphical object is allowed to move from the first side to the second side. However, when the first and second sides are not connected, the controller 180 does not allow the image to be moved across the connection. In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
    a flexible display provided on a main body of the mobile terminal, said flexible display configured to flex as the mobile terminal is attached to a part of the human body;
    a sensor configured to sense at least one of a position and movement of the main body; and
    a controller configured to control the flexible display to display an image in a first area of the flexible display so that a display direction of the image is in a first direction, and to move the displayed image in the first area to a second area of the flexibly display based on the at least of the sensed position and movement of the main body so that the display direction of the image is maintained in the first direction.

2. The mobile terminal of claim 1, further comprising:
    an input unit configured to receive a touch and drag signal corresponding to a touching and dragging of the image,
    wherein the controller is further configured to set the first direction of the image based on the touch and drag signal.

3. The mobile terminal of claim 1, wherein the image corresponds to at least one menu configured to execute an operation on the terminal.

4. The mobile terminal of claim 3, wherein the at least one menu includes a favorites menu.

5. The mobile terminal of claim 1, wherein the image is at least one of a menu icon, a moving image, a photograph, text, a map image, an Internet web browser, and a keypad screen.

6. The mobile terminal of claim 1, further comprising:
    an input unit configured to receive an input corresponding to a selection of the image,
    wherein the controller is further configured to control the flexibly display to display an execution screen corresponding to the selected image.

7. The mobile terminal of claim 6, wherein the execution screen includes a Qwerty input window.

8. The mobile terminal of claim 1, further comprising:
    a camera configured to capture the image,
    wherein the controller is further configured to transmit the image based on said at least one of the sensed position and movement of the main body.

9. The mobile terminal of claim 1, wherein the sensor includes at least one of a terrestrial magnetic sensor and a position sensor.

10. The mobile terminal of claim 1, wherein the controller is further configured to execute a predetermined operation based on the movement of the main body.

11. The mobile terminal of claim 1, further comprising:
    an input unit configured to receive a touching and dragging signal corresponding to a touching and dragging of the image,
    wherein the controller is further configured to increase or decrease a size of the image according to the touching and dragging signal.

12. The mobile terminal of claim 1, wherein the sensing unit is further configured to sense a movement of the human body, and
    wherein the controller is further configured to change the first direction to a second direction according to the sensed movement of the human body.

13. A method of controlling a mobile terminal, the method comprising:
    sensing at least one of a position and movement of a main body of the mobile terminal, said main body including a flexible display configured to flex as the mobile terminal is attached to a part of the human body;
    displaying an image in a first area of the flexible display so that a display direction of the image is in a first direction; and
    moving the displayed image in the first area to a second area of the flexibly display based on said at least of the sensed position and movement of the main body so that the display direction of the image is maintained in the first direction.

14. The method of claim 13, further comprising:
    receiving a touch and drag signal corresponding to a touching and dragging of the image;
    and setting the first direction of the image based on the touch and drag signal.

15. The method of claim 13, wherein the image corresponds to at least one menu configured to execute an operation on the terminal.

16. The method of claim 15, wherein the at least one menu includes a favorites menu.

17. The method of claim 13, wherein the image is at least one of a menu icon, a moving image, a photograph, text, a map image, an Internet web browser, and a keypad screen.

18. The method of claim 13, further comprising:
    receiving an input corresponding to a selection of the image, wherein the display step displays an execution screen corresponding to the selected image.

19. The method of claim 18, wherein the execution screen includes a Qwerty input window.

20. The method of claim 13, further comprising:
    a camera configured to capture the image; and
    transmitting the image based on said at least of the sensed position and movement of the main body.

21. The method of claim 13, further comprising:
    executing a predetermined operation based on the movement of the main body.

22. The method of claim 13, further comprising:
    receiving a touching and dragging signal corresponding to a touching and dragging of the image; and
    increasing or decreasing a size of the image according to the touching and dragging signal.

* * * * *